340-870.11 SR

XR 2,904,682

X7018D

Sept. 15, 1959 R. E. RAWLINS 2,904,682

FREQUENCY RATIO DETECTOR

Filed Aug. 22, 1955 2 Sheets-Sheet 1

INVENTOR.
ROBERT E. RAWLINS

BY George C. Sullivan
Agent

2904682
OR IN 328/161

Sept. 15, 1959 R. E. RAWLINS 2,904,682

FREQUENCY RATIO DETECTOR

Filed Aug. 22, 1955 2 Sheets-Sheet 2

INVENTOR.
ROBERT E. RAWLINS
BY George C. Sullivan
Agent

United States Patent Office 2,904,682

Patented Sept. 15, 1959

2,904,682

FREQUENCY RATIO DETECTOR

Robert E. Rawlins, North Hollywood, Calif., assignor to Lockheed Aircraft Corporation, Burbank, Calif.

Application August 22, 1955, Serial No. 529,681

10 Claims. (Cl. 250—27)

Figure 1:
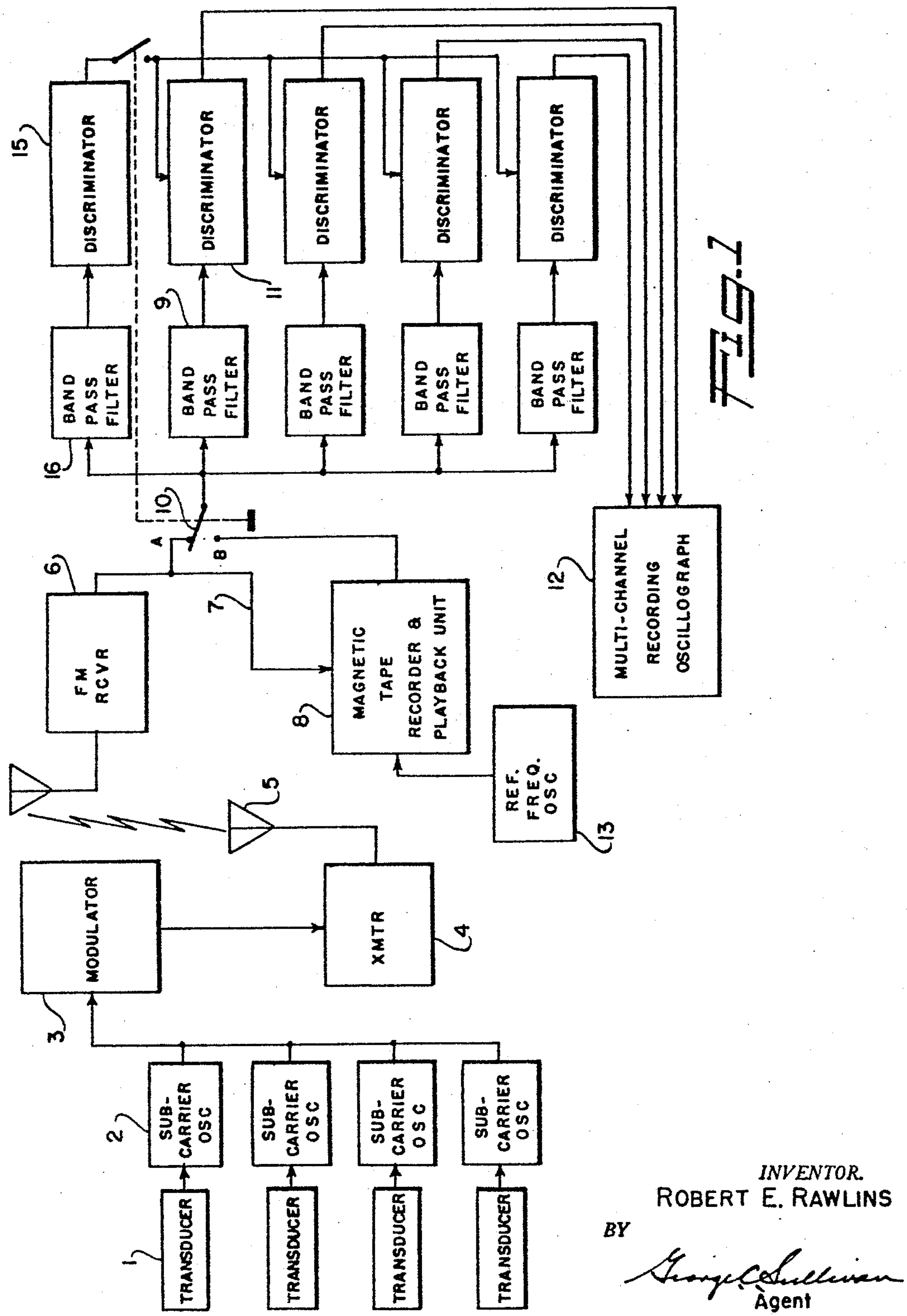

This invention relates generally to analogue dividers and more particularly to a frequency ratio detector for measuring the ratio between two frequencies such as may be required for wow (noise) compensation in telemetering data recording systems.

The comparison of two frequencies has generally been considered an extremely difficult operation. However, by employing the principles described herein such a comparison may be accomplished in a most simple and direct manner.

A typical application for the frequency ratio detector is in multi-channel AM–FM telemetering systems wherein radio broadcast information channels are utilized in combination with remotely located storage apparatus to gather various types of data such as temperature, pressure, vibration, acceleration, speed, etc. of automatic devices such as unmanned aircraft. Telemetering techniques are generally applied not only to provide instantaneous information concerning the operation of such devices but also to provide recorded data for use in the development and testing of the equipment.

Magnetic tape storage devices are usually employed in recording telemetered data since they are capable of storing large amounts of information in a small space and with a minimum amount of equipment. The tape may be played back at any time after recording for study and analysis.

While the storage of telemetered information on magnetic tape is most convenient, mechanical errors in the tape recorder and playback unit introduces errors in the recorded signals. These errors, mainly caused by tape speed variations, may be eliminated by introducing a reference frequency on the magnetic tape at the time the telemetered information is recorded and then comparing the reference frequency with the information signal frequency in accordance with the teachings of this invention.

An object of this invention is to provide a novel circuit arrangement for detecting the frequency ratio between two signals by width modulating the output of a modified one-shot multivibrator triggered by one of the signals with a control voltage which varies with the frequency of the second signal.

Another object of this invention is to provide a frequency ratio detector for correcting signal errors introduced by tape speed variations in magnetic recorder and playback devices.

Another object of this invention is to provide a frequency ratio detector for materially increasing the accuracy of conventional telemetering systems employing magnetic tape for the storage of information.

Still another object of this invention is to provide a frequency ratio detector circuit which requires no critical adjustments and which is reliable in operation.

Further and other objects will become apparent from a reading of the following description, especially when considered in combination with the accompanying drawing wherein like numerals refer to like parts.

Figure 2:
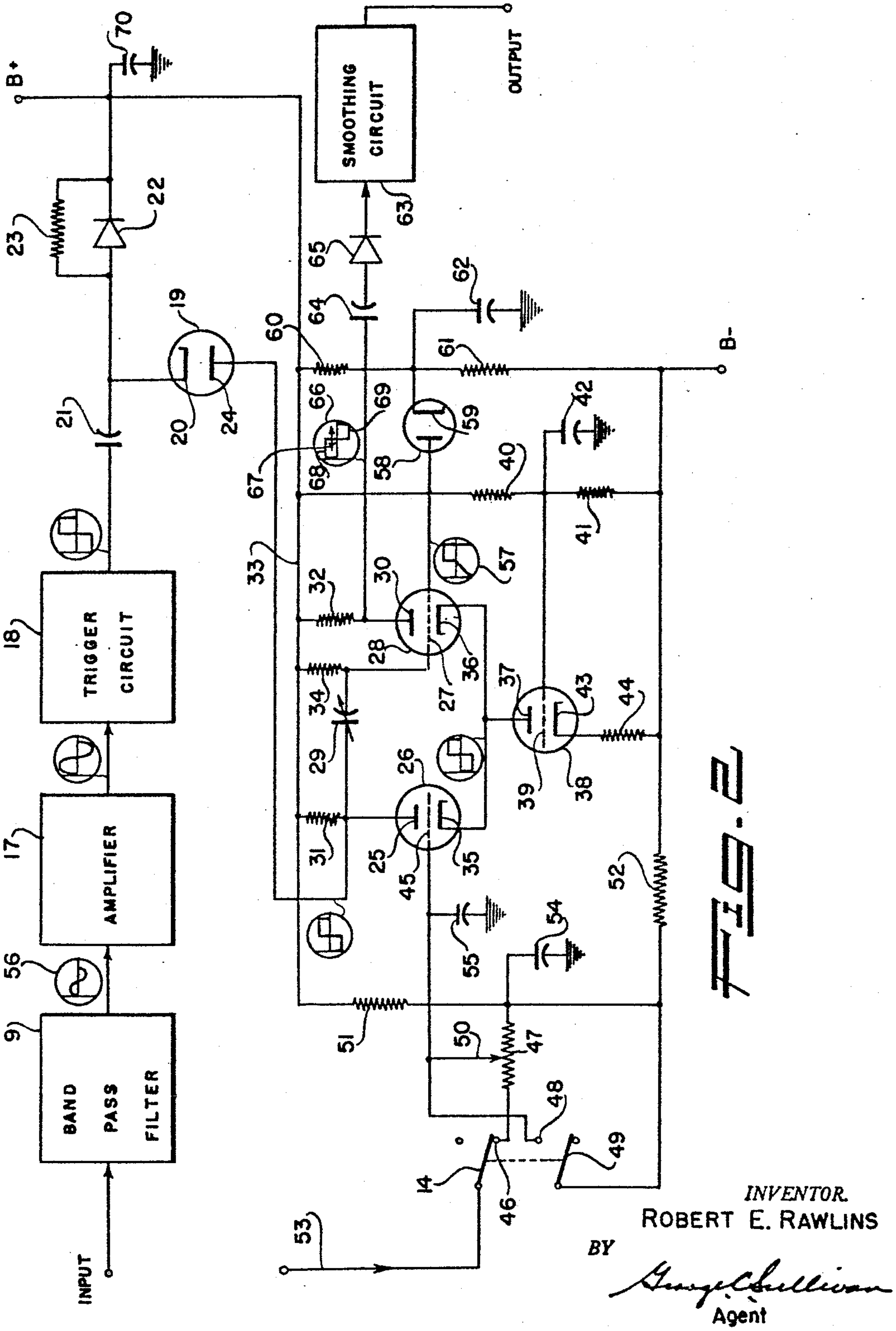

In the drawing:

Figure 1 is a block diagram of a typical telemetering system incorporating the frequency ratio detector of this invention; and Figure 2 is a circuit schematic of the frequency ratio detector.

Referring to Figure 1, a basically conventional telemetering system is illustrated, wherein a plurality of transducers 1 provide electrical signals to a plurality of subcarrier oscillators 2 for frequency modulating the subcarrier signal in accordance with the transducer input which may represent a variable such as temperature, pressure, acceleration, etc. The sub-carrier outputs are applied to a modulator 3 to frequency modulate a radio frequency carrier wave applied to transmitter 4. The resulting complex radio frequency signal is broadcast through antenna 5 to a remotely located FM receiver 6. While the telemetered information is being received, the output 7 of receiver 6 is applied to both a magnetic tape recorder and playback unit 8 and a plurality of band pass filter devices 9 through a switch 10. A band pass filter is provided for each sub-carrier oscillator 2 and tuned to the appropriate sub-carrier frequency. The band pass filter outputs are applied to a frequency discriminator 11, one for each filter, to provide a driving voltage for a recording oscillograph 12 or other suitable information display device which will supply instantaneous information as to the performance of the machine such as a missile carrying the transmitter and sub-carrier oscillators.

The magnetic tape recorder and playback unit 8 stores the telemetered information obtained directly from the output of receiver 6 so that should a failure occur in any of the units following the receiver a record may still be obtained. The use of tape also facilitates subsequent analysis of the data and materially increases the capacity of the system.

To eliminate the effects of tape speed variations during recording and playback of stored information on the magnetic tape, a reference frequency oscillator 13 is employed which applies to the tape while the signal from receiver 6 is being applied, a constant frequency reference signal. By comparing the tape outputs of the reference frequency and the frequency of the telemetered input signals supplied by receiver 6, a corrected tape output may be obtained which accurately represents the telemetered signal.

Figure 1 illustrates a typical arrangement incorporating the frequency ratio detector of this invention for making the tape speed variation correction. The actuation of switch 10 to position "B" connects the output of the recorder and playback unit 8 with band pass filters 9 and discriminators 11. At the same time, switch 14, which may be mechanically linked to switch 10, is closed, completing a circuit from a control discriminator 15 to the plurality of discriminators 11. The input to control discriminator 15 is obtained through a band pass filter 16 tuned to the reference frequency oscillator output. Control discriminator 15 in combination with each of the discriminators 11 thereby become operative to compare the reference frequency with a frequency modulated subcarrier signal from the telemetered information, as hereinafter described in connection with Figure 2, to eliminate the effects of tape speed variations and provide a driving voltage for a device such as recording oscillograph 12 which accurately represents the telemetered information.

Control discriminator 15 and the plurality of discriminators 11 may be structurally identical insofar as the circuitry is involved. Only their functions are made different through the actuation of a switching device. Control discriminator 15 in combination with any one of the discriminators 11 make up the frequency ratio detector. In the tape speed variation application, discriminator 15 provides a compensating voltage for discriminators 11 to eliminate the effects of tape speed variations by detecting the frequency ratio between the telemetered signal frequency and the reference signal frequency as illustrated in Figure 2. Band pass filter 9 receives an input from a recorded telemetering channel of the magnetic tape recorder and playback unit 8. This input represents the output of one of the subcarrier oscillators 2. The output of filter 9 is applied to an amplifier 17 for driving a suitable wave shaper such as a Schmitt trigger circuit 18 to produce a square wave pulse train, the frequency of which is equal to the frequency of the filter output and the amplitude of which is substantially constant. The pulses should preferably be generated at the same axis crossing points as the input signal from filter 9, though this is not absolutely essential.

The square wave output of the wave shaping trigger circuit 18 is applied to a differentiating network which includes a capacitor 21 and a resistor 31, the latter of which is located in the anode circuit of tube 26. In order to isolate the impedance of the trigger circuit from the subsequent circuit elements when tube 26 is conducting, a de-coupling diode 19 is employed in the differentiating circuit. Cathode 20 of diode 19 connects with capacitor 21 and anode 24 connects with anode 25 of the three element tube 26 which forms part of what is basically a one-shot multivibrator circuit. Cathode 20 of diode 19 also connects with a suitable source of electrical potential identified as B+ through diode rectifier 22 which blocks the negative going portions of the square wave output from trigger circuit 18 and passes the positive going pulses to ground through capacitor 70. A resistor 23 arranged in parallel with diode rectifier 22 prevents capacitor 21 from charging up due to leakage through diode 19 when it is coupled.

Anode 25 of tube 26 is coupled with grid 27 of a second three element tube 28 through a capacitor 29. Anode 30 of tube 28 and anode 25 of tube 26 also connect with B+ through plate load resistors 31 and 32 via lead 33 (as mentioned hereinabove, resistor 31 also serves as an element in the differentiating network). A grid leak resistor 34 is coupled between grid 27 and B+ for controlling the discharge rate of capacitor 29. Cathodes 35 and 36 of tubes 26 and 28 respectively are both connected to anode 37 of a tube 38 which serves as a high impedance cathode load device for maintaining substantially constant current flow through tubes 26 and 28. Grid 39 of tube 38 connects with B+ through resistor 40 and with a suitable source of negative potential identified as B— through resistor 41 for maintaining the proper grid bias. An A.C. bypass to ground in the circuit of grid 39 may be provided by capacitor 42. Cathode 43 of tube 38 is coupled through cathode load resistor 44 to B—. The function of tube 38 in the circuit of Figure 2 is to permit the use of a smaller B— voltage than would be required by the more conventional technique of employing a high resistance in the common cathode biasing circuit.

Grid 45 of tube 26 is connected to one pole 46 of switch 14 through pick-off arm 50 of a potentiometer 47 and to pole 48 of a second switch 49, bypassing potentiometer 47. Switch 49 may be mechanically coupled with switch 14 and be of the double-pole double-throw type, though this of course is a matter of design. The free end of potentiometer 47 is coupled with B+ through resistor 51 and with B— through resistor 52. Potentiometer 47 simply serves as a means for adjusting the grid bias voltage at tube 26 when the discriminator is being used as a frequency ratio detector wherein a compensating input signal is being applied to the grid through lead 53. When the device is being used as a discriminator, that is, when switch 14 is moved out of contact with pole 46 and when switch 49 is moved into contact with pole 48, potentiometer 47 is bypassed. This arrangement which takes potentiometer 47 out of the circuit would not be necessary, obviously, if the potentiometer were readjusted each time the circuit is switched over from a frequency ratio detector function to a discriminator function and vice versa. An A.C. bypass to ground is provided for the direct current voltage supply sources and grid 45 through capacitors 54 and 55.

The operation of the circuit when functioning as a frequency ratio detector can best be understood by following through a step by step analysis for one cycle of operation. Assuming an input wave form to amplifier 17 from band pass filter 9 as illustrated at 56, a square wave pulse of the same frequency but of opposite phase is produced by trigger circuit 18, then differentiated and applied to anode 25 of tube 26 and grid 27 of tube 28. Immediately preceding the application of this square wave to anode 25, tube 28 is conducting. When the differentiated pulse is applied, grid 27 of tube 28 is driven negative, tending to cut off or reduce to a small value the anode current of tube 28. Thus, the voltage at cathodes 35 and 36 is lowered to a level which will cause tube 26 to start conducting and cut off anode current in tube 28. So long as tube 26 is conducting, the anode of de-coupling diode 19 is held negative with respect to its cathode, opening the circuit between trigger circuit 18 and tube 26. Also, the charge built up on capacitor 29 leaks off to B+ through resistance 34 as indicated by wave form 57. When the potential on grid 27 rises to a predetermined level with respect to cathode 36, which is dependent upon the discharge rate of the capacitor 29-resistor 34 combination, and upon the voltage applied to grid 45 of tube 26, tube 28 will again conduct current causing cathodes 35 and 36 to rise. Tube 26 will be cut off at the higher cathode voltage, raising the potential at anode 24 of de-coupling diode 19 and allowing it to conduct. If the potential at grid 45 is relatively high due to the compensating input voltage applied through lead 53, cathodes 35 and 36 will be at a correspondingly higher potential thus delaying the point at which tube 28 will conduct since the voltage at grid 27, which is controlled by the discharge rate of capacitor 29, will have to go higher.

A catcher diode 58 is anode coupled with grid 27 to limit the maximum positive potential on the grid and maintain the pulse amplitude at anode 30 substantially constant. Cathode 59 of diode 58 connects with B+ and B— through resistors 60 and 61 for maintaining the proper cut-off bias. An A.C. bypass to ground for cathode 59 is provided by capacitor 62.

The output of the frequency ratio detector is obtained at anode 30 and applied to a direct current smoothing circuit 63 through a D.C. blocking capacitor 64 and rectifier 65. The wave form at anode 30 is illustrated at 66 as a square wave alternating current type signal, the frequency of which is equal to the frequency of the telemetered signal from the associated band pass filter 9.

The width of the positive or numerator pulse 68 will vary as indicated by arrows 67, directly with the variation in the compensating input voltage applied to grid 45 through lead 53. The width of the denominator pulse 69 will, on the other hand, vary inversely with the compensating voltage. By extracting the negative portion of the square wave, pulse width modulated signal and operating upon the same in a smoothing circuit, a direct current output voltage is obtained which is proportional to the ratio between the input frequency derived from the sub-carrier oscillator and the frequency represented by the compensating voltage. If the tape speed decreases, the compensating voltage will decrease, causing the direct current output voltage from the ratio detector to increase. Since the reference frequency is constant, the direct current output voltage from smoothing circuit 63 is proportional only to the frequency modulation signal applied to the tape recording and play-back unit and is independent of the variations in tape speed. This voltage may then be applied to an oscillograph, as 12 in Figure 1, or any similar device which will transform the voltage into a useful form for visual study and analysis.

The operation of the circuitry of Figure 2 as a discriminator rather than as a frequency ratioing device, is as described above except that grid 45 is held at a constant potential causing the output of smoothing circuit 63 to vary only as a function of the input frequency.

While the frequency ratio detector as illustrated by the circuit of Figure 2 has been described in connection with a telemetering system, it is obviously useful in any application where it is desirable to obtain the ratio between two frequencies.

It should be understood that certain alterations, modifications and substitutions may be made to the instant disclosure with out departing from the teachings of the invention as defined by the spirit and scope of the appended claims.

I claim:

1. A ratio detector responsive to a pair of frequency signal inputs to provide an output voltage representing the ratio therebetween comprising, discriminator means responsive to one of the frequency signals and providing an output voltage representing said one frequency, wave shaping means responsive to the other of the pair of frequency signals and providing a trigger signal having the same frequency as said other frequency, a pair of electron discharge devices each having an anode, a cathode and a control electrode, a source of electrical potential connecting with the anodes of said electron discharge devices, the anode of one of said discharge devices also having the trigger signal applied thereto, the control electrode of said one discharge device having the output from said discriminator means applied thereto, a coupling capacitor connecting the anode of said one discharge device with the control electrode of the other discharge device, resistor means controlling the discharge rate of said capacitor, constant current flow means connecting with both cathodes of said discharge devices whereby the total anode current flow through said discharge devices is maintained substantially constant, holding the voltage at said cathodes equal whereby said discharge devices alternately conduct within one complete cycle of the trigger signal applied to the anode of said one discharge device, the period of conduction of said one discharge device depending upon the voltage at its associated grid and the discharge rate of said capacitor, and rectifier means connecting with the anode of said other discharge device for detecting an alternating current component of the anode voltage, which component represents the ratio between the frequency signal inputs.

2. An electronic device for producing an output proportional to the ratio between the frequencies of two input signals comprising, means generating a voltage representing one of the two input signal frequencies, wave shaping means responsive to the other of the two input signals and generating a trigger signal of the same frequency as the other of the two input frequencies, a two tube multivibrator having a pair of anodes, a pair of cathodes and a pair of control electrodes, one of said anodes having said trigger signal applied thereto, capacitor means coupling said one anode with one of said control electrodes, capacitor discharge means associated with said capacitor means and fixing the discharge rate thereof, impedance means connecting with both said cathodes and maintaining the potential thereof substantially equal, and the other of said pair of control electrodes having said voltage applied thereto for time modulating the switching action of said multivibrator in cooperation with said capacitor means whereby the output obtained at the other of said pair of anodes represents the ratio between the input signal frequencies.

3. An electronic device for producing an output representing the ratio between the frequencies of two input signals comprising, means generating a control voltage representing one of the two input signal frequencies, wave shaping means responsive to the other of the two input signals and generating a trigger signal of the same frequency as the other of the two input frequencies, a pair of electron discharge devices, each having an anode and a control electrode, a capacitor coupling the anode of one of the pair of electron discharge devices with the control electrode of the other of the pair of electron discharge devices, the anode of the one electron discharge device having said trigger signal applied thereto for effecting sequential operation of said electron discharge devices in response to each trigger signal, the control electrode of said one electron discharge device having said control voltage applied thereto for maintaining anode current flow through said one electron discharge device for a time period depending upon the magnitude of the control voltage and upon the discharge rate of said capacitor, and means connecting with the anode of the other electron discharge device for extracting the resulting pulse width modulated signal which represents the ratio between the two input signal frequencies.

4. An electronic device for producing an output representing the ratio between the frequencies of two input signals comprising, means generating a control voltage representing one of the two input signal frequencies, wave shaping means responsive to the other of the two input signals and generating a trigger signal having the same frequency as the other of the two input frequencies, a pair of electron discharge devices, each having an anode and a control electrode, a capacitor coupling the anode of one of the pair of electron discharge devices with the control electrode of the other of the pair of electron discharge devices, the anode of the one electron discharge device having said trigger signal applied thereto for effecting sequential operation of said electron discharge devices in response to such trigger signal, the control electrode of said one electron discharge device having said control voltage applied thereto for maintaining anode current flow through said one electron discharge device for a time period proportional to the magnitude of the control voltage, de-coupling means electrically interposed between said wave shaping means and said pair of electron discharge devices and blocking the wave shaping means output only while said one electron discharge device is conducting, and means connecting with the anode of the other electron discharge device for extracting the resulting pulse width modulated signal which represents the ratio between the two input signal frequencies.

5. An electronic device for producing an output representing the ratio between the frequencies of two input signals comprising, means responsive to one of the two input frequencies and generating a control voltage representing the frequency thereof, wave shaping means responsive to the other of the two input signals and generating a trigger signal having the same frequency as the other of the two input signal frequencies, a pair of electron discharge devices, each having an anode, a cathode and a control electrode, a capacitor coupling the anode of one of the pair of electron discharge devices with the control electrode of the other of the pair of electron discharge devices, the anode of the one electron discharge device having said trigger signal applied thereto for effecting sequential operation of said electron discharge devices in response to each trigger signal, the control electrode of said one electron discharge device having said control voltage applied thereto for maintaining anode current flow through said one electron discharge device for a time period proportional to the magnitude of the control voltage, impedance means connecting with the cathodes of both said electron discharge devices for maintaining the voltage at the cathodes substantially equal and for maintaining the combined current flow therethrough substantially constant, decoupling means electrically interposed between said wave shaping means and said pair of electron discharge devices and blocking the wave shaping means output only while said one electron discharge device is conducting, and means connecting with the anode of the other electron discharge device for extracting the resulting pulse width modulated signal which represents the ratio between the two input signal frequencies.

6. An electronic device for producing an output signal proportional to the ratio between two input frequencies comprising, means responsive to one of the two input frequencies and generating a control voltage proportional thereto, wave shaping means responsive to the other of the two input frequencies and generating trigger signals at the same frequency as that of the input, a pair of electronic current control devices responsive to said trigger signals, energy storage means having a fixed time constant and coupling said current control devices as a one-shot multivibrator accomplishing one complete cycle of operation in response to the application of each trigger signal, one of the pair of current control devices having said control voltage applied thereto and establishing a threshold bias level at which said current control devices are operatively responsive to said energy storage means for switching conduction from one device to the other whereby a width modulated pulse output is produced which represents the ratio between the two input frequencies, and de-coupling means electrically interposed between said wave shaping means and said electron discharge devices and blocking the wave shaping means output only while one of the pair of electron discharge devices is conducting.

7. An electronic device for producing an output proportional to the ratio between two input frequencies comprising, means generating a voltage proportional to one of the two input frequencies, means responsive to the other of the two input frequencies and generating recurring trigger pulses at a corresponding frequency, a pair of multi-electrode electronic switching devices coupled to operate as a one-shot multivibrator, means applying said trigger pulses to an electrode of one of said switching devices to effect actuation of the other switching device, and means applying said voltage to one of the electrodes of said other switching device and holding the same actuated for a period of time varying substantially linearly with the magnitude of said voltage whereby a width modulated pulse is obtained which is proportional to the ratio between the two input frequencies.

8. An electronic device for producing an output representing the ratio between the frequencies of two input signals comprising, means generating a control voltage representing one of the two input signal frequencies, wave-shaping means responsive to the other of the two input signals and generating recurring trigger pulses of the same frequency as the other of the two input frequencies, a pair of electronic switching devices, energy storage means coupling said switching devices to operate as a one-shot multivibrator and normally establishing a biasing level urging one switching device to conduct in preference to the other switching device, means applying said trigger pulses to said one switching device through said energy storage means whereby said biasing level is changed to effect actuation of said other switching device, and means applying said voltage to said other switching device and holding the same actuated for a period of time varying substantially linearly with the magnitude of said voltage whereby a width modulated pulse is obtained which is proportional to the ratio between the two input frequencies.

9. An electronic device for producing an output representing the ratio between two input signals comprising, means generating a control voltage representing one of the two input signals, wave-shaping means responsive to the other of the two input signals and generating recurring trigger pulses of a frequency representing the other of the two input signals, a one-shot pair of electronic current control devices arranged as a multivibrator accomplishing one complete cycle of operation in response to the application of each trigger pulse, said one shot multivibrator including energy storage means having a time constant normally establishing a bias level urging one of said devices to conduct in preference to the other, said energy storage means being responsive to said trigger pulses for temporarily changing the bias level and effecting a switching action causing the other electronic current control device to conduct, and one of said electronic current control devices having said control voltage applied thereto and establishing a threshold bias level at which said one device will again conduct whereby a width modulated pulse output is obtained proportional to the ratio between the two input signals.

10. An electronic device for producing an output signal proportional to the ratio between two input quantities comprising, means responsive to one of the two input quantities and generating a control voltage proportional thereto, wave-shaping means responsive to the other of the two input quantities and generating recurring trigger pulses at a frequency representing the other of the two input quantities, a pair of electronic current control devices, energy storage means having a fixed time constant normally establishing a bias level urging one of said current control devices to conduct in preference to the other, said energy storage means being responsive to said trigger pulses for temporarily changing the bias level and effecting a switching action causing the other electronic current control device to conduct, impedance means coupling said current control devices together and maintaining substantially constant current flow therethrough, and means applying said control voltage to said other current control device and establishing a threshold bias level for the associated current control device proportional to the magnitude of said control voltage whereby a width modulated pulse output is produced which represents the ratio between the two input quantities.

References Cited in the file of this patent

UNITED STATES PATENTS

| | | |
|---|---|---|
| 2,421,018 | De Rosa | May 27, 1947 |
| 2,432,204 | Miller | Dec. 9, 1947 |
| 2,489,302 | Levy | Nov. 29, 1949 |
| 2,492,736 | Custin | Dec. 27, 1949 |
| 2,529,666 | Sands | Nov. 14, 1950 |
| 2,534,233 | Cleeton | Dec. 19, 1950 |
| 2,555,175 | Whitford | May 29, 1951 |
| 2,651,753 | Buyer | Sept. 8, 1953 |
| 2,681,414 | Strandberg | June 15, 1954 |
| 2,702,857 | Berger et al. | Feb. 22, 1955 |
| 2,742,591 | Procter | Apr. 17, 1956 |
| 2,774,872 | Howson | Dec. 18, 1956 |
| 2,775,693 | Berwin | Dec. 25, 1956 |